United States Patent
Feenstra et al.

(10) Patent No.: US 10,444,748 B2
(45) Date of Patent: Oct. 15, 2019

(54) IN-SITU MEASUREMENT LOGGING BY WIRELESS COMMUNICATION UNIT FOR COMMUNICATING ENGINE DATA

(71) Applicant: GE Aviation Systems LLC, Grand Rapids, MI (US)

(72) Inventors: Keith Richard Feenstra, Hudsonville, MI (US); Michael Clay Scholten, Grand Rapids, MI (US); Hilbrand Harlan-Jacob Sybesma, Plainwell, MI (US); Michael James Dusseau, Walker, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 143 days.

(21) Appl. No.: 15/632,649

(22) Filed: Jun. 26, 2017

(65) Prior Publication Data
US 2018/0004197 A1 Jan. 4, 2018

Related U.S. Application Data

(60) Provisional application No. 62/356,692, filed on Jun. 30, 2016.

(51) Int. Cl.
| | |
|---|---|
| *G05B 23/02* | (2006.01) |
| *F01D 17/02* | (2006.01) |
| *B64D 45/00* | (2006.01) |
| *H04B 7/185* | (2006.01) |
| *F01D 21/00* | (2006.01) |
| *G06F 16/48* | (2019.01) |

(52) U.S. Cl.
CPC ......... *G05B 23/0283* (2013.01); *B64D 45/00* (2013.01); *F01D 17/02* (2013.01); *F01D 21/003* (2013.01); *G06F 16/489* (2019.01); *H04B 7/18506* (2013.01); *B64D 2045/0085* (2013.01); *F05D 2260/80* (2013.01)

(58) Field of Classification Search
CPC ........... G05B 23/0283; G06F 17/30044; G06F 16/489; F01D 17/02; F01D 21/003; F05D 2260/80; H04B 7/18506; B64D 45/00
See application file for complete search history.

(56) References Cited

U.S. PATENT DOCUMENTS

| | | |
|---|---|---|
| 5,444,861 A | 8/1995 | Adamec et al. |
| 5,848,367 A | 12/1998 | Lotocky et al. |

(Continued)

FOREIGN PATENT DOCUMENTS

| | | |
|---|---|---|
| CN | 204495911 U | 7/2015 |
| EP | 2579473 B1 | 8/2016 |
| JP | 2957370 B2 | 10/1999 |

*Primary Examiner* — Bryan Bui
(74) *Attorney, Agent, or Firm* — Dority & Manning, P.A.

(57) ABSTRACT

Systems and methods for recording and communicating engine data are provided. One example aspect of the present disclosure is directed to a method for monitoring performance. The method includes receiving, by one or more computing devices, a measurement from a sensor. The method includes assigning, by the one or more computing devices, a time to the measurement. The method includes storing, by the one or more computing devices, the received measurement and the assigned time to a file. The method includes transmitting, by the one or more computing devices, the file to a remove computing device associated with a ground system.

20 Claims, 5 Drawing Sheets

(56) References Cited

U.S. PATENT DOCUMENTS

| | | |
|---|---|---|
| 6,092,008 A | 7/2000 | Bateman |
| 6,351,603 B2 | 2/2002 | Waithe et al. |
| 6,353,734 B1 | 3/2002 | Wright et al. |
| 6,385,513 B1 | 5/2002 | Murray et al. |
| 6,628,995 B1 | 9/2003 | Korson et al. |
| 6,671,589 B2 | 12/2003 | Holst et al. |
| 6,831,912 B1 | 12/2004 | Sherman |
| 6,868,325 B2 | 3/2005 | Menon et al. |
| 6,894,611 B2 | 5/2005 | Butz et al. |
| 7,218,277 B1 | 5/2007 | Smith |
| 7,595,730 B2 | 9/2009 | Ziarno |
| 7,636,568 B2 | 12/2009 | Gould et al. |
| 7,720,442 B2 | 5/2010 | McGuffin |
| 7,755,512 B2 | 7/2010 | Ziarno |
| 7,844,385 B2 | 11/2010 | Loda et al. |
| 7,908,042 B2 | 3/2011 | Brinkley et al. |
| 8,051,031 B2 | 11/2011 | Sims, III et al. |
| 8,055,393 B2 | 11/2011 | Sims, III et al. |
| 8,121,140 B2 | 2/2012 | McGuffin et al. |
| 8,140,298 B2 | 3/2012 | Bordry |
| 8,220,038 B1 | 7/2012 | Lucchesi et al. |
| 8,259,002 B2 | 9/2012 | Vacanti et al. |
| 8,284,674 B2 | 10/2012 | True et al. |
| 8,285,865 B2 | 10/2012 | Gruyer et al. |
| 8,351,927 B2 | 1/2013 | Wright et al. |
| 8,401,021 B2 | 3/2013 | Buga et al. |
| 8,457,034 B2 | 6/2013 | Kuehl et al. |
| 8,462,793 B2 | 6/2013 | Turcot |
| 8,615,384 B2 | 12/2013 | Angus et al. |
| 8,639,401 B2 | 1/2014 | Bailey et al. |
| 8,683,266 B2 | 3/2014 | Migliasso et al. |
| 8,699,403 B2 | 4/2014 | Lynch et al. |
| 8,723,692 B2 | 5/2014 | Farley et al. |
| 8,732,812 B2 | 5/2014 | Chopart |
| 8,781,982 B1 | 7/2014 | Das et al. |
| 8,798,817 B2 | 8/2014 | O'Dell et al. |
| 8,823,357 B2 | 9/2014 | Shafer et al. |
| 8,856,277 B2 | 10/2014 | Saugnac |
| 8,881,294 B2 | 11/2014 | Johnson et al. |
| 8,903,601 B2 | 12/2014 | Muirhead |
| 8,984,346 B2 | 3/2015 | Frayssignes et al. |
| 8,988,249 B2 | 3/2015 | Chevrette et al. |
| 8,997,197 B2 | 3/2015 | Nord et al. |
| 9,026,273 B2 | 5/2015 | Ziarno |
| 9,026,279 B2 | 5/2015 | Ziarno |
| 9,038,047 B2 | 5/2015 | Young et al. |
| 9,092,629 B2 | 7/2015 | Guzman et al. |
| 9,100,361 B1 | 8/2015 | Lucchesi et al. |
| 9,124,580 B1 | 9/2015 | Sampigethaya |
| 9,208,308 B2 | 12/2015 | McLain et al. |
| 9,225,765 B2 | 12/2015 | Kimberly et al. |
| 9,313,276 B2 | 4/2016 | Pereira |
| 9,367,970 B2 | 6/2016 | Ziarno |
| 9,369,548 B2 | 6/2016 | Voigt et al. |
| 9,390,381 B2 | 7/2016 | Davari et al. |
| 9,418,493 B1 | 8/2016 | Dong |
| 9,420,595 B2 | 8/2016 | Beacham, Jr. et al. |
| 9,426,650 B2 | 8/2016 | Bangole et al. |
| 9,481,473 B2 | 11/2016 | Skertic |
| 9,490,876 B2 | 11/2016 | Choi |
| 9,576,404 B2 | 2/2017 | Ziarno et al. |
| 9,639,997 B2 | 5/2017 | Chai et al. |
| 9,934,540 B2 * | 4/2018 | Schneider ............ G06F 19/326 |
| 10,035,609 B2 * | 7/2018 | Ziarno ................... B64D 45/00 |
| 2003/0158963 A1 | 8/2003 | Sturdy et al. |
| 2003/0225492 A1 | 12/2003 | Cope et al. |
| 2008/0272915 A1 | 11/2008 | Day |
| 2009/0058682 A1 | 3/2009 | True |
| 2011/0125348 A1 | 5/2011 | Sandell et al. |
| 2012/0095662 A1 | 4/2012 | Roy et al. |
| 2014/0013002 A1 | 1/2014 | Holstein et al. |
| 2014/0068265 A1 | 3/2014 | Irwin |
| 2015/0161618 A1 | 6/2015 | Angus et al. |
| 2015/0222604 A1 | 8/2015 | Ylonen |
| 2015/0244683 A1 | 8/2015 | Schreiber |
| 2015/0276837 A1 | 10/2015 | Kim et al. |
| 2015/0293765 A1 | 10/2015 | Angus et al. |
| 2015/0330869 A1 | 11/2015 | Ziarno |
| 2016/0075443 A1 | 3/2016 | Schmutz et al. |
| 2016/0078695 A1 * | 3/2016 | McClintic ............ G06Q 10/06 701/29.4 |
| 2016/0092192 A1 | 3/2016 | Frayssignes et al. |
| 2016/0098259 A1 | 4/2016 | Mitchell |
| 2016/0110179 A1 | 4/2016 | Weckesser et al. |
| 2016/0124738 A1 | 5/2016 | Haukom et al. |
| 2016/0154391 A1 | 6/2016 | Pavaskar et al. |
| 2016/0200455 A1 | 7/2016 | Gadgil et al. |
| 2016/0203659 A1 | 7/2016 | Chai et al. |
| 2016/0219022 A1 | 7/2016 | Peterson |
| 2016/0257429 A1 | 9/2016 | Szeto |
| 2016/0314632 A1 | 10/2016 | Lu et al. |

* cited by examiner

IN-SITU MEASUREMENT LOGGING BY WIRELESS COMMUNICATION UNIT FOR COMMUNICATING ENGINE DATA

PRIORITY CLAIM

The present application claims the benefit of priority of U.S. Provisional Patent Application No. 62/356,692, entitled "IN-SITU MEASUREMENT LOGGING BY WIRELESS COMMUNICATION UNIT FOR COMMUNICATING ENGINE DATA," filed Jun. 30, 2016, which is incorporated herein by reference for all purposes.

FIELD

The present subject matter relates generally to aviation systems.

BACKGROUND

An aerial vehicle can include one or more engines for propulsion of the aerial vehicle. The one or more engines can include and/or can be in communication with one or more electronic engine controllers (EECs). The one or more EECs can record data related to the one or more engines. If the data resides on the EECs, then it can be difficult for a ground system to use the data. Automated engine data transfer replaces manual data retrieval and increases the availability of data at the ground system.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a wireless communication unit. The wireless communication unit includes one or more memory devices. The wireless communication unit includes one or more processors. The one or more processors are configured to receive a measurement from a sensor. The one or more processors are configured to assign a time to the measurement. The one or more processors are configured to store the received measurement and the assigned time to a file. The one or more processors are configured to transmit the file to a computing device associated with a ground system.

Other example aspects of the present disclosure are directed to systems, methods, aircrafts, engines, controllers, devices, non-transitory computer-readable media for recording and communicating engine data. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
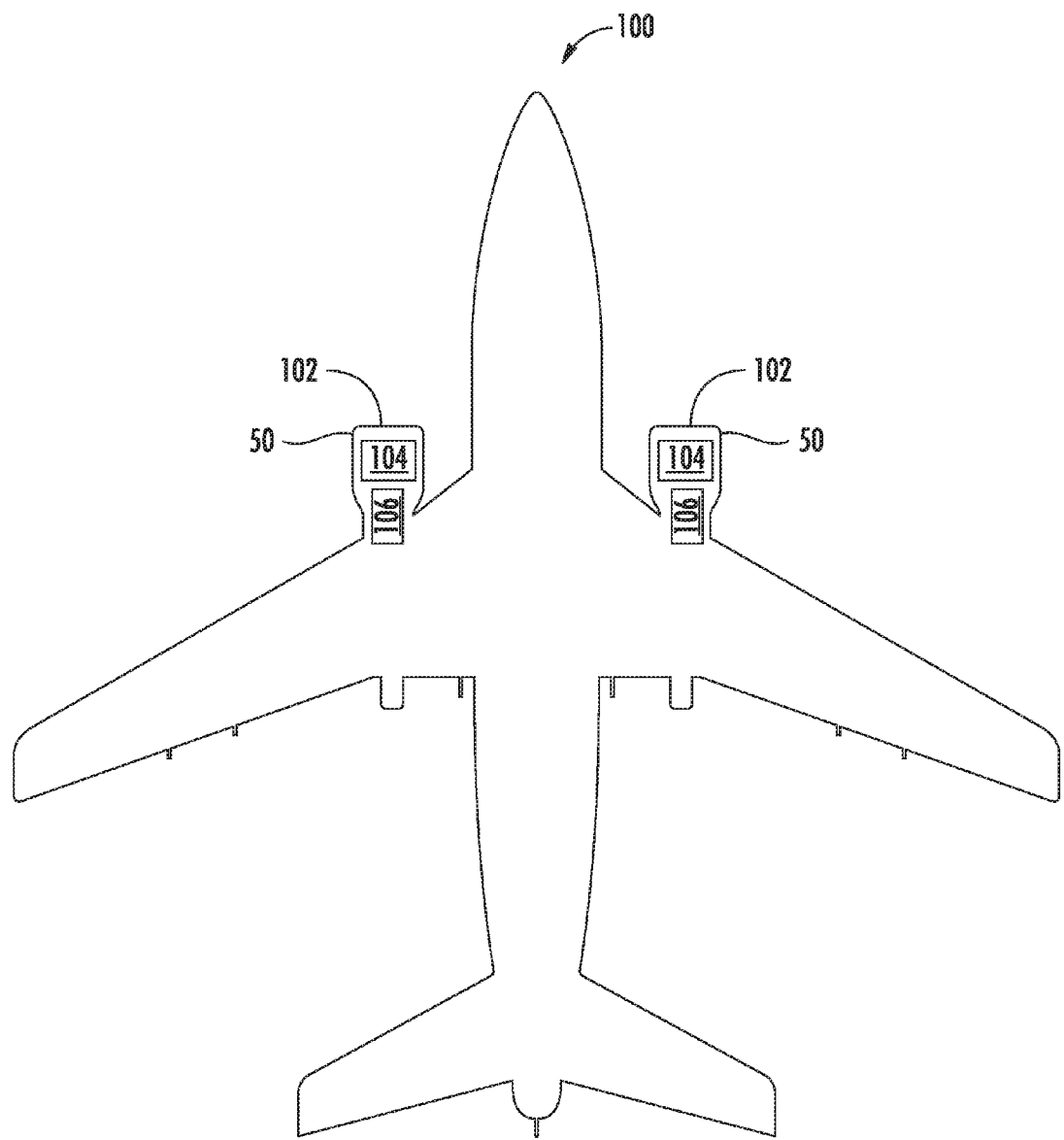
FIG. 1 depicts an aerial vehicle according to example embodiments of the present disclosure.

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to methods and systems for recording and communicating engine data on an aerial vehicle. The aerial vehicle can include one or more engines for operations, such as propulsion of the aerial vehicle. The one or more engines can include and/or be in communication with one or more electronic engine controllers (EECs).

According to example embodiments of the present disclosure, the one or more engines and/or the one or more EECs can include and/or can be in communication with one or more wireless communication units (WCUs). During flight or other operation of the aerial vehicle, the one or more EECs can record data related to the one or more engines and can communicate (e.g., transmit, send, push, etc.) the data to the one or more WCUs, where the WCUs can store the data in a memory. Each EEC can communicate the data to its own associated WCU. In addition and/or in the alternative, each EEC can communicate data to a single WCU located on the aerial vehicle. Upon the occurrence of a particular trigger condition (e.g., flight phase transition), the one or more WCUs can communicate the data to a ground system over a wireless network, such as a cellular network.

In some embodiments, the WCU can be adaptable for communication with the EEC via an interface. The interface can be a Telecommunications Industry Association (TIA) TIA-485 interface or other interface, such as an Ethernet interface, an Aeronautical Radio INC (ARINC) 664 interface, an RS-232 interface, etc. The WCU can be adaptable for communication with the ground system via an antenna. The WCU can transmit information received from the EEC to the ground system. The ground system can use the information received from the WCU to determine a status (e.g., state, health, etc.) of an engine associated with the WCU. In addition, the WCU can be adaptable for communication with a portable maintenance access terminal (PMAT) for maintenance.

A line-replacement unit (LRU) can be a component of the aerial vehicle made for easy replacement. In some embodiments, the LRU can be the WCU. According to example embodiments of the present disclosure, the LRU can have one or more sensors for measuring conditions associated with the LRU such as temperature, vibration, etc. The measured conditions can be associated with a time (e.g., a timestamp) and recorded. Upon the occurrence of a trigger condition, the measured conditions can be communicated to a ground based computing system.

The ground based computing system can process the measured conditions to generate a predictive model that can be used to predict when the LRU should be replaced and/or maintained based on various conditions. In some embodiments, the predictive model can be generated using machine learning techniques. As an example, if the LRU outlives a predicted life or does not last as long as predicted based on the comparison of the recorded measured conditions with the predictive model, then the predictive model can be updated to make more accurate predictions based on the measured conditions. If the LRU performs as expected based on the comparison of the recorded measured conditions with the predictive model, then the predictive model can be reinforced. In this way, conditions affecting the operational life of a LRU, such as a WCU, can be logged and modeled to predict the operational life of the LRU. As used herein, predicting LRU conditions or WCU conditions can include predicting what conditions on the LRU or the WCU will be measured to be in the future.

The predictive models can be implemented/stored in one or more computing devices associated with the ground based system. In addition and/or in the alternative, the predictive model can be uploaded to the WCU so that the WCU can perform diagnostics based on the measurements in real-time or near real-time.

One example aspect of the present disclosure is directed to a wireless communication unit. The wireless communication unit includes one or more memory devices. The wireless communication unit includes one or more processors. The one or more processors are configured to receive a measurement from a sensor. The one or more processors are configured to assign a time to the measurement. The one or more processors are configured to store the received measurement and the assigned time to a file. The one or more processors are configured to transmit the file to a computing device associated with a ground system.

In an embodiment, the measurement includes a temperature. In an embodiment, the measurement includes an indication of vibration. In an embodiment, the measurement includes a humidity. In an embodiment, the measurement includes failure data. In an embodiment, the measurement includes a current. In an embodiment, the measurement includes a voltage. In an embodiment, the measurement includes a frequency. In an embodiment, the one or more processors are further configured to receive a second measurement from a second sensor. In an embodiment, the one or more processors are further configured to assign the time to the second measurement. In an embodiment, the one or more processors are further configured to store the received second measurement and the assigned time to the file. In an embodiment, the computing device downloads the file via a website. In an embodiment, the computing device stores the file for analysis. In an embodiment, the analysis includes comparing a predictive model to information in the file. In an embodiment, the predictive model is updated based on the information in the file. In an embodiment, future performance of a component is predicted based on the comparison. In an embodiment, the component is the wireless communication unit. In an embodiment, the comparison includes an emphasis on measurements below a threshold. In an embodiment, the comparison includes an emphasis on measurements above a threshold. In an embodiment, the measurement and the time are used by the ground system to predict wireless communication unit conditions.

One example aspect of the present disclosure is directed to a method for monitoring performance. The method includes receiving, by one or more computing devices, a measurement from a sensor. The method includes assigning, by the one or more computing devices, a time to the measurement. The method includes storing, by the one or more computing devices, the received measurement and the assigned time to a file. The method includes transmitting, by the one or more computing devices, the file to a computing device associated with a ground system.

In an embodiment, the measurement includes a temperature. In an embodiment, the measurement includes an indication of vibration. In an embodiment, the measurement includes a humidity. In an embodiment, the measurement includes failure data. In an embodiment, the measurement includes a current. In an embodiment, the measurement includes a voltage. In an embodiment, the measurement includes a frequency. In an embodiment, the method includes receiving, by the one or more computing devices, a second measurement from a second sensor. In an embodiment, the method includes assigning, by the one or more computing devices, the time to the second measurement. In an embodiment, the method includes storing, by the one or more computing devices, the received second measurement and the assigned time to the file. In an embodiment, the computing device downloads the file via a website. In an embodiment, the remote computing device stores the file for analysis. In an embodiment, the analysis includes comparing a predictive model to information in the file. In an embodiment, the predictive model is updated based on the information in the file. In an embodiment, future performance of a component is predicted based on the comparison. In an embodiment, the component is a wireless communication unit. In an embodiment, the comparison includes an emphasis on measurements below a threshold. In an embodiment, the comparison includes an emphasis on measurements above a threshold. In an embodiment, the measurement and the time are used by the ground system to predict wireless communication unit conditions.

Another example aspect of the present disclosure is directed to a system. The system includes one or more memory devices. The system includes one or more processors. The one or more processors are configured to receive a measurement from a sensor. The one or more processors are configured to assign a time to the measurement. The one or more processors are configured to store the received measurement and the assigned time to a file. The one or more processors are configured to transmit the file to a computing device associated with a ground system.

In an embodiment, the measurement includes a temperature. In an embodiment, the measurement includes an indication of vibration. In an embodiment, the measurement includes a humidity. In an embodiment, the measurement includes failure data. In an embodiment, the measurement includes a current. In an embodiment, the measurement includes a voltage. In an embodiment, the measurement includes a frequency. In an embodiment, the one or more processors are further configured to receive a second measurement from a second sensor. In an embodiment, the one or more processors are further configured to assign the time to the second measurement. In an embodiment, the one or more processors are further configured to store the received second measurement and the assigned time to the file. In an embodiment, the computing device downloads the file via a website. In an embodiment, the computing device stores the file for analysis. In an embodiment, the analysis includes comparing a predictive model to information in the file. In an embodiment, the predictive model is updated based on the information in the file. In an embodiment, future performance of a component is predicted based on the comparison. In an embodiment, the component is a wireless communication unit. In an embodiment, the comparison includes an emphasis on measurements below a threshold. In an embodiment, the comparison includes an emphasis on measurements above a threshold. In an embodiment, the measurement and the time are used by the ground system to predict wireless communication unit conditions.

Another example aspect of the present disclosure is directed to an aerial vehicle. The aerial vehicle includes one or more memory devices. The aerial vehicle includes one or more processors. The one or more processors are configured to receive a measurement from a sensor. The one or more processors are configured to assign a time to the measurement. The one or more processors are configured to store the received measurement and the assigned time to a file. The one or more processors are configured to transmit the file to a computing device associated with a ground system.

In an embodiment, the measurement includes a temperature. In an embodiment, the measurement includes an indication of vibration. In an embodiment, the measurement includes a humidity. In an embodiment, the measurement includes failure data. In an embodiment, the measurement includes a current. In an embodiment, the measurement includes a voltage. In an embodiment, the measurement includes a frequency. In an embodiment, the one or more processors are further configured to receive a second measurement from a second sensor. In an embodiment, the one or more processors are further configured to assign the time to the second measurement. In an embodiment, the one or more processors are further configured to store the received second measurement and the assigned time to the file. In an embodiment, the computing device downloads the file via a website. In an embodiment, the computing device stores the file for analysis. In an embodiment, the analysis includes comparing a predictive model to information in the file. In an embodiment, the predictive model is updated based on the information in the file. In an embodiment, future performance of a component is predicted based on the comparison. In an embodiment, the component is a wireless communication unit. In an embodiment, the comparison includes an emphasis on measurements below a threshold. In an embodiment, the comparison includes an emphasis on measurements above a threshold. In an embodiment, the measurement and the time are used by the ground system to predict wireless communication unit conditions.

Another example aspect of the present disclosure is directed to a ground system. The ground system includes one or more memory devices. The ground system includes one or more processors. The one or more processors are configured to execute a program comprising a model to predict operation of the wireless communication unit. The one or more processors are configured to receive a file from the wireless communication unit. The file includes at least one measurement from a sensor associated with the wireless communication unit. The file includes at least one time assigned to the at least one measurement. The one or more processors are configured to refine the model based on the at least one measurement and the at least one time.

FIG. 1 depicts a block diagram of an aerial vehicle 100 according to example embodiments of the present disclosure. The aerial vehicle 100 can include one or more engines 102. The one or more engines 102 can cause operations, such as propulsion, of the aerial vehicle 100. An engine 102 can include a nacelle 50 for housing components. An engine 102 can be a gas turbine engine. A gas turbine engine can include a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

The one or more engines 102 can include and/or be in communication with one or more electronic engine controllers (EECs) 104. The one or more engines 102 and/or the one or more EECs 104 can include and/or be in communication with one or more wireless communication units (WCUs) 106. The one or more EECs 104 can record data related to the one or more engines 102 and communicate (e.g., transmit, send, push, etc.) the data to the one or more WCUs 106. The one or more WCUs 106 can communicate the data to a ground system via, for instance, an antenna positioned and configured within the nacelle 50. The one or more WCUs 106 can be located within a nacelle 50 housing an engine 102 or another location on the aerial vehicle 100.

Figure 2:
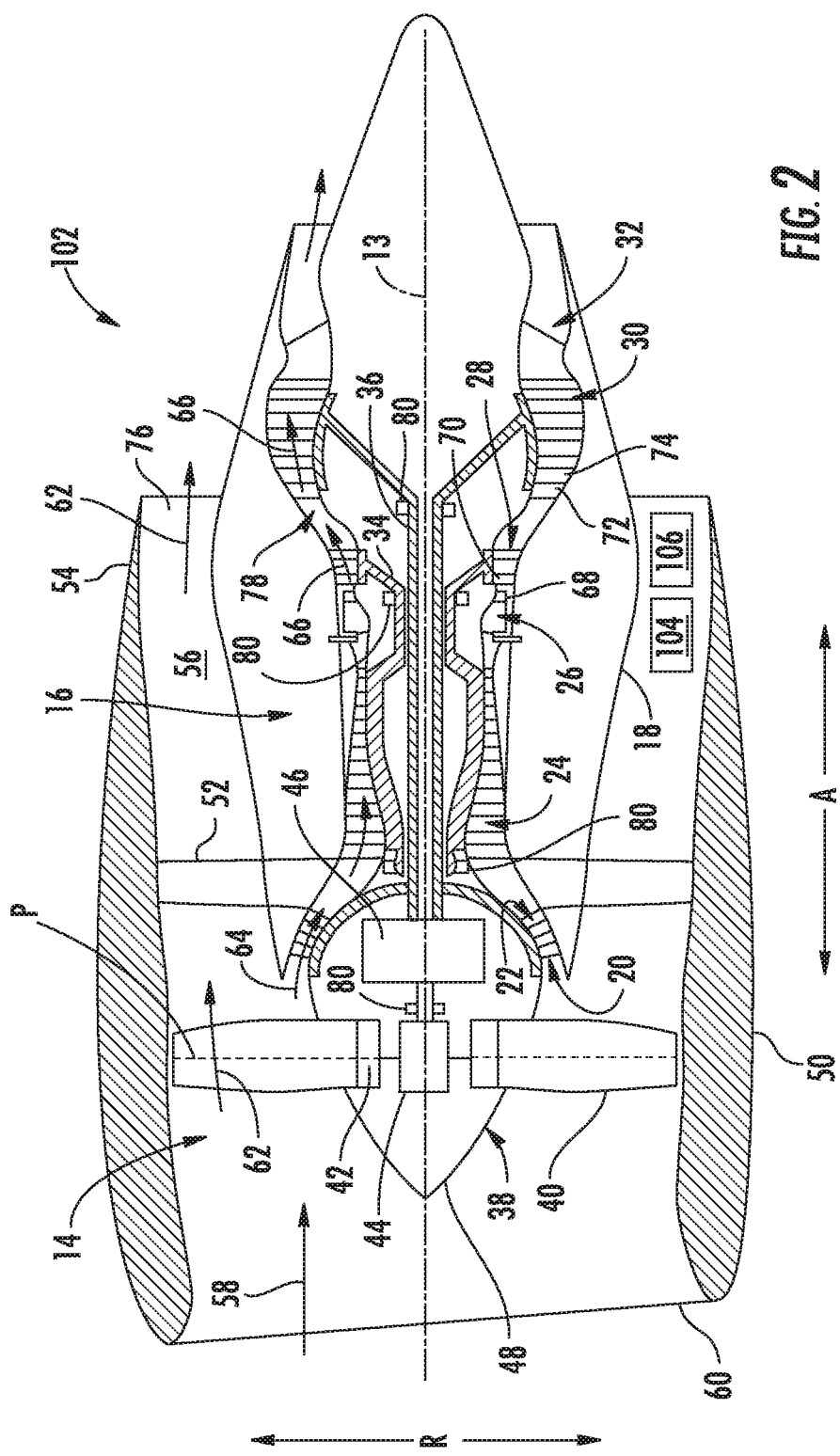
FIG. 2 depicts an engine according to example embodiments of the present disclosure.

FIG. 2 depicts an engine 102 according to example embodiments of the present disclosure. The engine 102 can be one of the one or more engines 102 on the aerial vehicle 100 in FIG. 1. More particularly, for the embodiment of FIG. 2, the engine 102 is configured as a gas turbine engine, or rather as a high-bypass turbofan jet engine 102, referred to herein as "turbofan engine 102." Those of ordinary skill in the art, using the disclosures provided herein, will understand that WCUs can be used in conjunction with other types of propulsion engines without deviating from the scope of the present disclosure, including engines associated with helicopters and other aerial vehicles As shown in FIG. 2, the turbofan engine 102 defines an axial direction A (extending parallel to a longitudinal centerline 13 provided for reference), a radial direction R, and a circumferential direction (not shown) extending about the axial direction A. In general, the turbofan includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases and the core turbine engine 16 includes, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Accordingly, the LP shaft 36 and HP shaft 34 are each rotary components, rotating about the axial direction A during operation of the turbofan engine 102.

In order to support such rotary components, the turbofan engine includes a plurality of air bearings 80 attached to various structural components within the turbofan engine 102. Specifically, for the embodiment depicted the bearings 80 facilitate rotation of, e.g., the LP shaft 36 and HP shaft 34 and dampen vibrational energy imparted to bearings 80 during operation of the turbofan engine 102. Although the bearings 80 are described and illustrated as being located generally at forward and aft ends of the respective LP shaft 36 and HP shaft 34, the bearings 80 may additionally, or alternatively, be located at any desired location along the LP shaft 36 and HP shaft 34 including, but not limited to, central or mid-span regions of the shafts 34, 36, or other locations along shafts 34, 36 where the use of conventional bearings 80 would present significant design challenges. Further, bearings 80 may be used in combination with conventional oil-lubricated bearings. For example, in one embodiment, conventional oil-lubricated bearings may be located at the ends of shafts 34, 36, and one or more bearings 80 may be located along central or mid-span regions of shafts 34, 36.

Referring still to the embodiment of FIG. 2, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 13 by LP shaft 36 across a power gear box 46. The power gear box 46 includes a plurality of gears for adjusting the rotational speed of the fan 38 relative to the LP shaft 36 to a more efficient rotational fan speed. More particularly, the fan section includes a fan shaft rotatable by the LP shaft 36 across the power gearbox 46. Accordingly, the fan shaft may also be considered a rotary component, and is similarly supported by one or more bearings.

Referring still to the exemplary embodiment of FIG. 2, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 102, a volume of air 58 enters the turbofan through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 102 depicted in FIG. 2 is provided by way of example only, and that in other exemplary embodiments, the turbofan engine 102 may have any other suitable configuration. It should also be appreciated, that in still other exemplary embodiments, aspects of the present disclosure may be incorporated into any other suitable gas turbine engine or other propulsion engine. For example, in other exemplary embodiments, aspects of the present disclosure may be incorporated into, e.g., a turboprop engine, a turboshaft engine, or a turbojet engine. Further, in still other embodiments, aspects of the present disclosure may be incorporated into any other suitable turbomachine, including, without limitation, a steam turbine, a turboshaft, a centrifugal compressor, and/or a turbocharger.

According to example aspects of the present disclosure, the engine 102 can include an electronic engine controller (EEC) 104. The EEC 104 can record operational and performance data for the engine 102. The EEC 104 can be in communication with a wireless communication unit (WCU) 106. The WCU 106 can be mounted on the engine 102. The EEC 104 and the WCU 106 can communicate using wireless and/or wired communications. In some embodiments, the communication with the EEC 104 and the WCU 106 can be one-way communication (e.g., the EEC 104 to the WCU 106). In some embodiments, the communication with the EEC 104 and the WCU 106 can be two-way communication. The WCU 106 can be located on the engine or elsewhere on the aircraft. The nacelle 50 can include an antenna (not shown). In another aspect, the antenna can be integrated with the WCU 106. In another aspect, the antenna can be located elsewhere on the aircraft and used by the WCU and optionally other devices.

Figure 3:
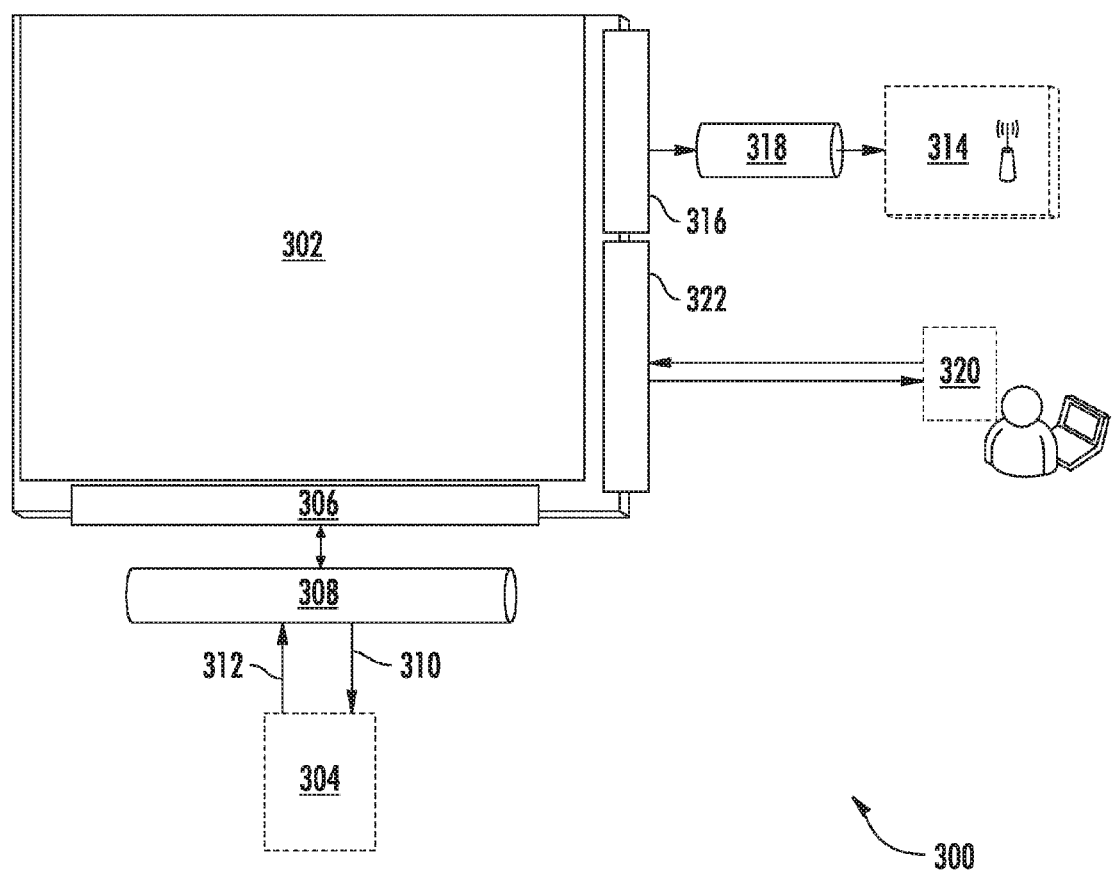
FIG. 3 depicts a wireless communication system according to example embodiments of the present disclosure.

FIG. 3 depicts a wireless communication system (WCS) 300 according to example embodiments of the present disclosure. The system 300 can include a wireless communication unit (WCU) 302. The WCU 302 can be the WCU 106 of FIGS. 1 and 2. The WCU 302 can be in communication with an electronic engine controller (EEC) 304 over a suitable interface 306. The EEC 304 can be the same as the EEC 104 of FIGS. 1 and 2. In some embodiments, the interface 306 can be, for instance, a Telecommunications Industry Association (TIA) TIA-485 interface 306.

In particular implementations, the WCU 302 and the EEC 304 can communicate via a connection 308 with, for instance, the TIA-485 interface 306. The connection 308 can, for example, accommodate other interfaces, such as an Ethernet connection, a wireless connection, or other interface. The WCU 302 can transmit addressing (e.g., memory location, bit size, etc.) information and/or acknowledgements 310 to the EEC 304 via the connection 308. The WCU 302 can receive data 312 from the EEC 304 via the connection 308 and can store the data in one or more memory devices. The data 312 can be, for instance, continuous engine operation data, such as thrust level inputs, engine response to thrust level inputs, vibration, flameout, fuel consumption, ignition state, N1 rotation, N2 rotation, N3 rotation, anti-ice capability, fuel filter state, fuel valve state, oil filter state, etc.

The WCU 302 can be configured to communicate the data 312 over a wireless network via an antenna 314 upon the occurrence of one or more trigger conditions, such as trigger conditions based on signals indicative of an aircraft being on the ground or near the ground. In some embodiments, the antenna 314 can be integrated into the WCU 302. In some embodiments, the WCU 302 can include a radio frequency (RF) interface 316. In an embodiment, the antenna 314 can be in communication with the RF interface 316 via an RF cable 318. In an embodiment, the antenna 314 can be placed in the nacelle 50 of an aircraft 102. The nacelle 50 of an aerial vehicle 100 can be made of conductive materials, which can obstruct cellular reception and transmission. In some embodiments, the antenna can be a directional antenna that is oriented near one or more gaps in the nacelle 50 to permit the antenna 314 to communicate directionally outside of the nacelle 50 when the aerial vehicle 100 is landing or upon the occurrence of other trigger conditions.

In some embodiments, the WCU 302 can include an interface for communicating with a portable maintenance access terminal (PMAT) 320. The access terminal can be implemented, for instance, on a laptop, tablet, mobile device, or other suitable computing device. The interface can be, for instance, a Generic Stream Encapsulation (GSE) interface 322 or other suitable interface. The PMAT 320 can be used by a maintenance person to calibrate, troubleshoot, initialize, test, download diagnostic data from, etc. the WCU 302.

The WCU 302 can communicate using wireless communication. The wireless communication can be performed using any suitable wireless technique and/or protocol. For example, the wireless communication can be performed using peer-to-peer communications, network communications, cellular-based communications, satellite-based communications, etc. As another example, the wireless communications can be performed using Wi-Fi, Bluetooth, ZigBee, etc.

Figure 4:
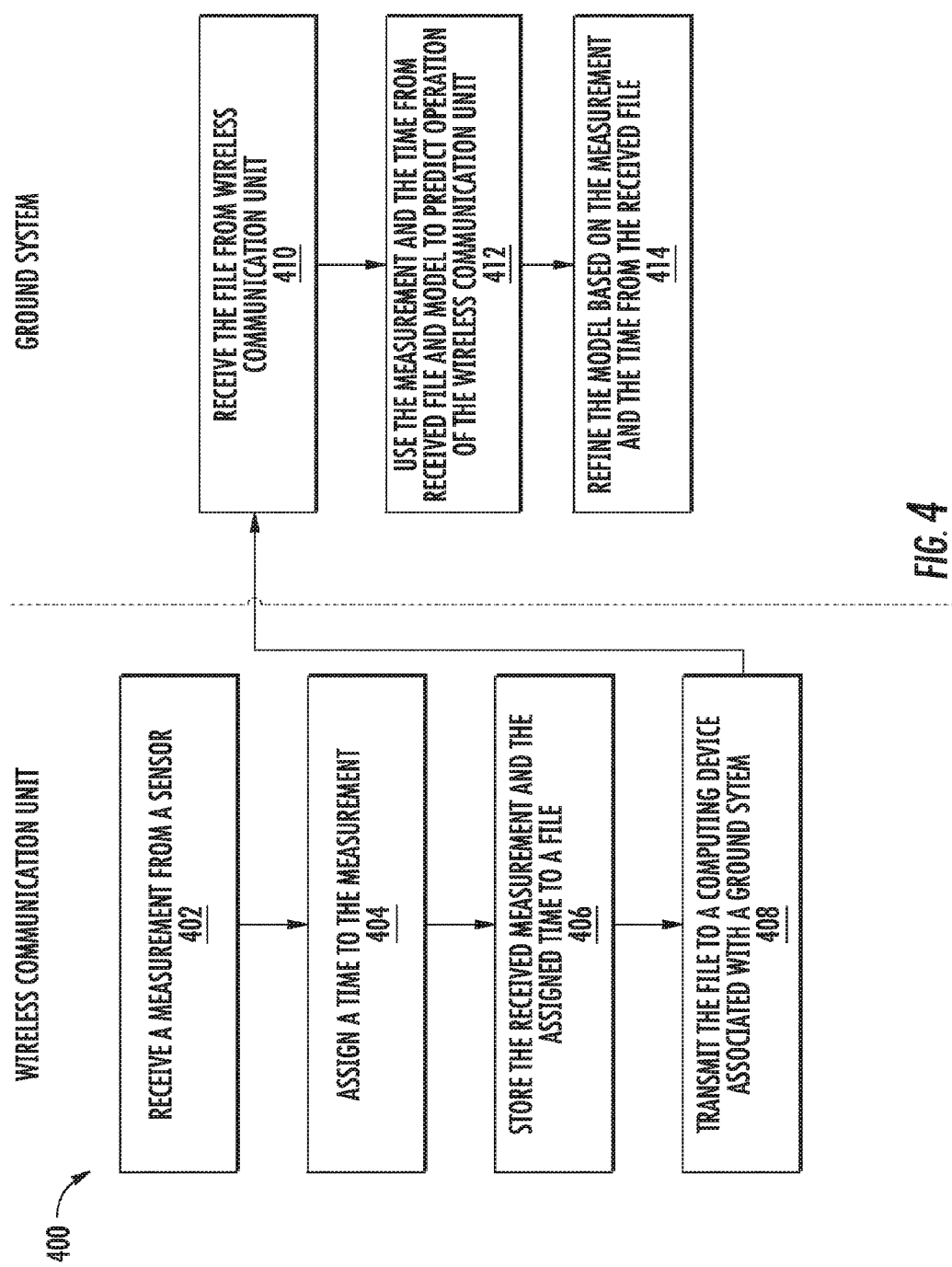
FIG. 4 depicts a flow diagram of an example method according to example embodiments of the present disclosure.

FIG. 4 depicts a flow diagram of an example method (400) for monitoring performance. The method of FIG. 4 can be implemented using, for instance, the WCU 302 of FIG. 3. FIG. 4 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (402), a measurement can be received from a sensor. For instance, the WCU 302 can receive a measurement from a sensor. In some embodiments, the measurement can include a temperature. In some embodiments, the measurement can include an indication of vibration. In some embodiments, the measurement can include a humidity. In some embodiments, the measurement can include failure data. In some embodiments, the measurement can include a current. In some embodiments, the measurement can include a voltage. The measurement can include a frequency. Optionally, a second measurement can be taken from a second sensor. Any number of measurements can be taken from any number of sensors without deviating from the scope of the present disclosure.

At (404), a time can be assigned to the measurement. For instance, the WCU 302 can assign a time to the measurement. For example, a timestamp indicating the time the measurement was taken can be assigned to the measurement. In an embodiment with multiple measurements, measurements taken at the same instant can be assigned the same time. At (406), the received measurement and the assigned time can be stored (e.g., recorded, loaded, etc.) to a file. For instance, the WCU 302 can store the received measurement and the assigned time to a file. In an embodiment, the file can include all received measurements and assigned times taken during a window. In an aspect, the window can be a flight. In an aspect, the window can be a component lifetime. In an aspect, the window can be a power cycle.

At (408), the file can be transmitted to a computing device associated with a ground system or other remote device. For instance, the WCU 302 can transmit the file to a computing device associated with a ground system. Transmitting the file to a computing device associated with a ground system can include transmitting the file via a wired connection. Transmitting the file to a computing device associated with a ground system can include transmitting the file via a wireless connection. Transmitting the file to a computing device associated with a ground system can include transmitting the file via a cellular network. Transmitting the file to a computing device associated with a ground system can include transmitting the file via a satellite network. In an aspect, the computing device can be a remote computing device. The component can be a wireless communication unit (WCU). The computing device can download the file via a website.

The computing device associated with the ground system can use the measurement and the time in the received file to predict WCU conditions. At (410), the computing device associated with the ground system can receive the file from the WCU. At (412), the computing device associated with the ground system can use the measurement and the time from received file and a model to predict operation of the WCU. The model can be received, retrieved, and/or created by the WCU. The WCU can execute (run, etc.) a program that includes the model. At (414), the computing device associated with the ground system can refine the model based on the measurement and the time from the received file. The model referred to at (412) and (414) is described in more detail below.

The computing device can store the file for analysis. The analysis can include comparing a predictive model to information in the file. The comparison can include an emphasis on measurements below a threshold. The comparison can include an emphasis on measurements above a threshold.

Time associated with extreme measurements, such as extreme temperature or extreme transient (e.g., change in current, change in voltage, change in frequency, etc.) can be scrutinized. For example, other measurements at such times can be examined. As another example, time associated with extreme measurements can be examined for performance. Extreme measurements can be measurements above a high threshold. Extreme measurements can be measurements below a low threshold. The predictive model can be updated based on the information in the file. An accuracy of the predictive model can be assessed based on the information in the file. Future performance of a component can be predicted based on the comparison. An example predictive model is described in the following paragraphs.

The computing device can include a model trainer. The computing device can implement the model trainer to train and/or re-train one or more models (e.g., neural networks) such as multi-layer non-linear models (e.g., deep neural networks). As examples, the model trainer can perform back propagation techniques such as batch gradient descent or stochastic gradient descent to train the models. The model trainer can also leverage dropout techniques to combat model over-fitting. The model trainer can train models using measurement information from the file as training measurement information.

Thus, in some implementations, the computing device can implement the model trainer to train new models or update versions on existing models on additional measurement information. As an example, the model trainer can use measurement information hand-labeled as being desirable to train one or more models to provide outputs regarding the desirability of measurement information. In particular, in some implementations, the additional training data can be measurement information that a user entered through an editing interface. Thus, updated versions of the models of a particular component can be trained by the model trainer on specialized data sets to better infer, capture, and store measurement information, which can better reflect conditions experienced by the particular component. In other instances, the additional training data can be aggregated user feedback.

The model trainer can include computer logic utilized to provide desired functionality. Thus, the model trainer can be implemented in hardware, firmware and/or software controlling a general purpose processor. In some implementations, the model trainer includes program code files stored on the storage device, loaded into memory, and executed by a processor or can be provided from computer program products, for example, computer executable instructions that are stored in a tangible computer-readable storage medium, such as a random access memory (RAM) hard disk or card or other computer-readable optical or magnetic media.

In one example implementation, systems and methods use a Mixture of Hidden Markov Models for condition monitoring. In particular, aspects of the present disclosure are directed to creation of a probabilistic Mixture of Hidden Markov Models (MoHMM) from a given data set collected from a system to be monitored. Further aspects of the present disclosure are directed to use of the MoHMM to perform condition monitoring for the system.

More particularly, a data set can be collected that is indicative of operational conditions at one or more components of the system. For example, the data set can include data from various types of sensors, data collection devices, or other feedback devices that monitor conditions at the one or more components or for the system as a whole. A plurality of features can be extracted from the data set. The data set can be fully or partially labeled. For example, labeling of data can be performed manually by human experts and/or according to known ground truth information during data collection. The data set can be used to train the MoHMM in a process generally known as training.

Once trained, the resulting MoHMM can be used for verification, classification, and/or anomaly detection. In particular, new, unlabeled data collected from the same system can be inputted into the MoHMM. In response to the new input data, the MoHMM can output at least one class prediction and/or at least one fitness score in a process generally known as prediction. In some implementations, features are extracted from the new data prior to input into the MoHMM.

In some implementations, the class prediction or classification can identify a particular event, action, or operation that the input data most closely resembles (e.g., matches features from training data that corresponds to such event or operation). Further, in some implementations, the fitness score can indicate a confidence in the class prediction or can be some other metric that indicates to what degree the input data resembles the event or operation identified by the class prediction.

The at least one class prediction and/or fitness score outputted by the MoHMM can be used to verify proper operation of the portion of the system being monitored (e.g., the portion from which or concerning which the data was collected). As one example, in some implementations, the MoHMM can output a single classification and/or fitness score which simply indicates whether the input data is classified as indicative of normal system operation or classified as indicative of anomalous system operation. For example, in some implementations, a single fitness score outputted by the MoHMM can be compared to a threshold value. A fitness score greater the threshold value can indicate that the system is properly operating, while a fitness score less than the threshold value can indicate that the system is not properly operating (e.g., an anomaly has occurred). In some implementations, the particular threshold value used can depend upon the class prediction provided by the MoHMM.

In other implementations, the MoHMM can output multiple class predictions and/or fitness scores. As one example, in some implementations, each Hidden Markov Model (HMM) included in the MoHMM can output a class prediction and corresponding fitness score for the set of input data. The class prediction that has the largest corresponding fitness score can be selected and used as the prediction provided by the MoHMM as a whole. Thus, the output of the MoHMM can be the most confident prediction provided by any of the HMMs included in the MoHMM.

As another example, in some implementations, the multiple classifications/scores output by the MoHMM can respectively identify multiple potential events to which the input data corresponds over time. In particular, the multiple classifications/scores can identify a sequence of events/operations over time.

More particularly, a monitored system can transition between events during operation. As an example, during a period of operation, an aircraft can have multiple events (e.g., a short-haul, a long-haul, etc.) and each event can include a number of its own events or sub-events (e.g., taxiing, take-off, ascent, etc.) that occur in a particular order.

Thus, in some implementations, the MoHMM can output a plurality of classifications and a plurality of fitness scores, respectively, associated with the plurality of classifications. The plurality of classifications can identify a temporal sequence of different events experienced or performed by the system (as evidenced by the input data). The respective fitness score for each classification can indicate a confidence that the event identified by the corresponding classification was executed without an anomaly. As such, in some implementations, if all of the plurality of fitness scores for a series of classifications are respectively greater than a plurality of threshold values, then the entire sequence of identified events can be assumed to have occurred within normal operating parameter ranges. On the other hand, if one (or more) of the fitness scores for the series of classifications is less than its respective confidence score, then an anomaly can be detected with respect to the event identified by the classification to which such fitness score corresponds. In such way, aspects of the present disclosure can be used to provide condition monitoring, including anomaly detection, for complex systems which transition between multiple states or events over time.

Furthermore, in some implementations in which each Hidden Markov Model (HMM) included in the MoHMM outputs a class prediction and corresponding fitness score, the above described temporal sequence of different events predicted by the MoHMM can be identified by selecting, for any particular temporal segment or portion of input data, the class prediction that has the largest corresponding fitness score as the output of the MoHMM. Thus, the most confident class prediction for each segment of the input data can be used as the output of the MoHMM, thereby providing a temporal sequence of predictions which respectively identify the sequence of events.

In an example application, aspects of the present disclosure can be applied to perform condition monitoring for one or more aviation systems, such as aircraft engines, EECs, and/or WCUs. For example, full-flight data can be inputted into a trained MoHMM to receive predictions (e.g., verification or anomaly detection) regarding the operational status of various aviation systems. As noted above, use of MoHMM in this fashion can be particularly advantageous for condition monitoring for systems which undergo a temporal sequence of events, such as taxiing, take-off, ascent, etc., as described above.

Furthermore, aspects of the present disclosure are based in part on fundamental probability theory, and thus provide a clear framework that enables models to be altered or extended. For instance, aspects of the present disclosure enable incorporation of data from new sensors, or combination with other (probabilistic) models, such as models that allow for the comparison of a single LRU to data collected by all LRUs in the field.

Figure 5:
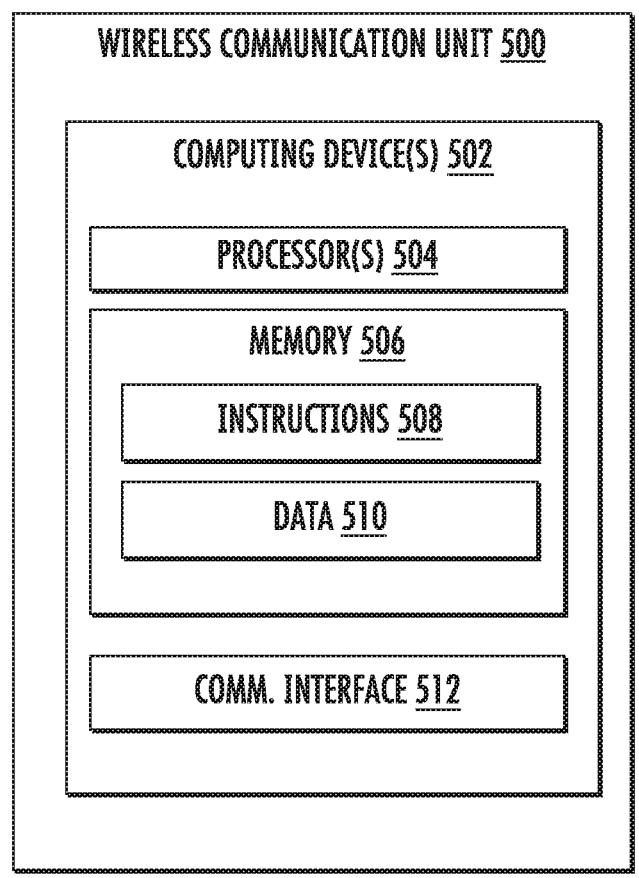
FIG. 5 depicts a computing system for implementing one or more aspects according to example embodiments of the present disclosure.

FIG. 5 depicts a block diagram of an example computing system that can be used to implement a wireless communication unit (WCU) 500, such as WCU 302, or other systems according to example embodiments of the present disclosure. As shown, the WCU 500 can include one or more computing device(s) 502. The one or more computing device(s) 502 can include one or more processor(s) 504 and one or more memory device(s) 506. The one or more processor(s) 504 can include any suitable processing device, such as a microprocessor, microcontroller, integrated circuit, logic device, or other suitable processing device. The one or more memory device(s) 506 can include one or more computer-readable media, including, but not limited to, non-transitory computer-readable media, RAM, ROM, hard drives, flash drives, or other memory devices.

The one or more memory device(s) 506 can store information accessible by the one or more processor(s) 504, including computer-readable instructions 508 that can be executed by the one or more processor(s) 504. The instructions 508 can be any set of instructions that when executed by the one or more processor(s) 504, cause the one or more processor(s) 504 to perform operations. The instructions 508 can be software written in any suitable programming language or can be implemented in hardware. In some embodiments, the instructions 508 can be executed by the one or more processor(s) 504 to cause the one or more processor(s) 504 to perform operations, such as the operations for recording and communicating engine data, as described with reference to FIG. 4, and/or any other operations or functions of the one or more computing device(s) 502.

The memory device(s) 506 can further store data 510 that can be accessed by the processors 504. For example, the data 510 can include data associated with engine performance, engine operation, engine failure, errors in engine performance, errors in engine operation, errors in engine behavior, expected engine behavior, actual engine behavior, etc., as described herein. The data 510 can include one or more table(s), function(s), algorithm(s), model(s), equation(s), etc. according to example embodiments of the present disclosure.

The one or more computing device(s) 502 can also include a communication interface 512 used to communicate, for example, with the other components of system. For example, the communication interface 512 can accommodate communications with the EEC 304, the antenna 314, the PMAT 320, a ground control system, other WCUs 302, a central computing device, any other device, and/or any combination of the foregoing. The communication interface 512 can include any suitable components for interfacing with one or more network(s), including for example, transmitters, receivers, transceivers, ports, controllers, antennas, or other suitable components.

Although specific features of various embodiments may be shown in some drawings and not in others, this is for convenience only. In accordance with the principles of the present disclosure, any feature of a drawing may be referenced and/or claimed in combination with any feature of any other drawing. Example aspects of the present disclosure are discussed with referenced to aerial vehicles. Those of ordinary skill in the art, using the disclosures provided herein, will understand that example aspects of the present disclosure can be used with other vehicles having engines.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of monitoring a line-replaceable unit of an aerial vehicle, the method comprising:
receiving a file associated with a wireless communication unit (WCU) located on an aerial vehicle, the file comprising at least one measurement from a sensor associated with the WCU and at least one time assigned to the at least one measurement, the at least one measurement having a value above a high threshold or a value below a low threshold;

predicting one or more operational conditions experienced by the line-replaceable unit (LRU) at least in part by comparing a predictive model to the at least one measurement, the one or more operational conditions comprising at least one condition affecting the operational life of the LRU, and the predictive model configured to output a predicted operational life of the LRU of the aerial vehicle; and changing the predictive model based at least in part on the one or more operational conditions having been predicted, the predictive model upon having been changed being configured to output an updated predicted operational life of the LRU.

2. The method of claim 1, comprising:
receiving the file associated with the WCU at the WCU, the WCU comprising a processor configured to perform the receiving, the comparing, the predicting, and/or the changing.

3. The method of claim 1, comprising:
receiving the file associated with the WCU at a computing device associated with a ground system, the file associated with the WCU having been transmitted from the WCU to the computing device, and the computing device comprising a processor configured to perform the receiving, the comparing, the predicting, and/or the changing.

4. The method of claim 1, comprising:
generating the predictive model at least in part using a model trainer, the model trainer training or retraining the predictive model.

5. The method of claim 1, comprising:
generating the predictive model at least in part using a Mixture of Hidden Markov Models.

6. The method of claim 1, wherein the predictive model comprises a probabilistic Mixture of Hidden Markov Models having been created using a data set collected from an electronic engine controller associated with the WCU.

7. The method of claim 1, comprising:
transmitting the predictive model from a computing device associated with a ground system to the WCU.

8. The method of claim 1, wherein comparing the predictive model to the at least one measurement comprises monitoring a temporal sequence of events, the temporal sequence of events comprising taxiing, take-off, and/or ascent.

9. The method of claim 1, wherein predicting one or more operational conditions experienced by the LRU comprises detecting an anomaly based at least in part on a fitness score output by the predictive model.

10. The method of claim 1, wherein the at least one measurement comprises a temperature, an indication of vibration, a humidity, a failure data, a current, a voltage, and/or a frequency.

11. The method of claim 1, wherein the LRU comprises the WCU.

12. The method of claim 1, comprising:
performing the method in real-time or near-real time during a first flight.

13. The method of claim 12, comprising:
transmitting a second file associated with the WCU from the WCU to a computing device associated with a ground system, the file comprising at least one measurement from a sensor associated with the WCU and at least one time assigned to the at least one measurement, the at least one measurement having a value above a high threshold or a value below a low threshold; and receiving an updated predictive model, the updated predictive model having been changed based at least in part on information in the second file; the updated predictive model configured to output an updated predicted operational life of the LRU.

14. The method of claim 13, comprising:
receiving a third file associated with the WCU, the third file comprising at least one measurement from a sensor associated with the WCU and at least one time assigned to the at least one measurement, the at least one measurement having a value above a high threshold or a value below a low threshold; and predicting one or more operational conditions experienced by the LRU at least in part by comparing the updated predictive model to the at least one measurement in the third file, the one or more operational conditions comprising at least one condition affecting the operational life of the LRU.

15. The method of claim 1, wherein comparing comprises an emphasis on measurements below the low threshold.

16. The method of claim 1, wherein comparing comprises an emphasis on measurements above the high threshold.

17. The method of claim 1, wherein predicting one or more operational conditions experienced by the LRU comprises:
outputting a plurality of class predictions, respective ones of the plurality of class predictions indicating an event or an operation of the aerial vehicle.

18. The method of claim 17, comprising:
identifying a temporal sequence of events based at least in part on the plurality of class predictions.

19. A wireless communication unit, comprising:
one or more memory devices and one or more processors, the one or more memory devices comprising computer-executable instructions which when executed by the one or more processors, cause the one or more processors to:
predict one or more operational conditions experienced by a line-replicable unit (LRU) of an aerial vehicle at least in part by comparing a predictive model to at least one measurement having been received from a sensor associated with a wireless communication unit (WCU) located on the aerial vehicle and having a time assigned thereto, the at least one measurement comprising a value above a high threshold or a value below a low threshold, the one or more operational conditions comprising at least one condition affecting the operational life of the LRU, and the predictive model configured to output a predicted operational life of the LRU; and
change the predictive model based at least in part on the one or more operational conditions having been predicted, the predictive model upon having been changed being configured to output an updated predicted operational life of the LRU.

20. A ground system, comprising:
one or more memory devices and one or more processors, the one or more memory devices comprising computer-executable instructions which when executed by the one or more processors, cause the one or more processors to:
predict one or more operational conditions experienced by a line-replicable unit (LRU) of an aerial vehicle at least in part by comparing a predictive model to at least one measurement having been received from a sensor associated with a wireless communication unit (WCU) located on the aerial vehicle and having a time assigned thereto, the at least one measurement comprising a value above a high threshold or a value below a low threshold, the one or more operational conditions comprising at least one condition affecting the operational life of the LRU, and the predictive model configured to output a predicted operational life of the LRU; and change the predictive model based at least in part on the one or more operational conditions having been predicted, the predictive model upon having been changed being configured to output an updated predicted operational life of the LRU.

\* \* \* \* \*